March 22, 1932.  H. A. DENMIRE  1,850,450
RUBBER MIXING MILL
Filed April 5, 1929

INVENTOR
Harald A. Denmire
BY
Evans & McCoy
ATTORNEYS

Patented Mar. 22, 1932

1,850,450

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

RUBBER MIXING MILL

Application filed April 5, 1929. Serial No. 352,638.

This invention relates to rubber working apparatus and particularly to that apparatus, commonly called a rubber mixing mill, used for mixing and kneading rubber or like materials to the proper plasticity, the invention having for its object to provide a new and improved apparatus for mixing rubber and other plastic materials having characteristics similar to rubber.

In rubber mills such as have been heretofore commonly employed, a mass of raw rubber is supported in the bight of a pair of kneading rolls and rubber from the mass is drawn in a thin sheet from the mass through the bight of the rolls, the thin sheet of rubber adhering to one of the rolls and being carried on the surface of a roll back into the main mass of rubber, the mixing and kneading operation is continued until the entire mass has been kneaded and mixed. The frictional action of the rolls on the mass of raw rubber supported in the bight of the rollers generates heat and, unless great care is exercised in regulating the supply of rubber, the rate of feed and the cooling of the rolls, portions of the mass may be overheated and partially vulcanized, a result which is highly undesirable and which injuriously affects the quality of the product.

An important object of the invention is to provide an improved apparatus for mixing rubber and the like whereby the same may be more quickly and thoroughly mixed.

Another object is to provide apparatus of simple and improved design for mixing rubber and the like whereby the maximum temperatures reached in the rubber mass during the mixing of the same may be materially lessened.

A further object is to provide improved apparatus for mixing rubber and the like with a plurality of successively acting rolls adapted to be operated at different surface speeds whereby the rubber will be more thoroughly kneaded and mixed and whereby excessive heating of any portion of the mass of rubber being treated is avoided.

A still further object is to provide improved apparatus for mixing rubber and the like adapted to build up a plurality of banks of stock in order that the rubber will be quickly kneaded and thoroughly mixed and in order to provide a more rapid and continuous feeding of the stock to prevent overheating.

With the foregoing and other objects in view, which will be apparent from the detailed description to follow, this invention consists in certain novel features of construction and combinations of parts which will be readily understood by those skilled in the art.

In the accompanying drawings which illustrates one suitable embodiment of this invention, Figure 1 is a perspective view of the rubber mixing apparatus.

Heretofore, it has been the practice in the rubber working art to employ a pair of rolls operated at different speeds to give the desired differential kneading action to the rubber to be mixed. This practice consumed considerable time and it has been found in many instances that the material was not thoroughly mixed. It was necessary in the apparatus used in this prior practice, to operate the mixing rolls at comparatively high speeds in order to satisfactorily mix the material and to save time. It is plainly evident to and understood by those skilled in the art, that considerable heat is generated by friction when the rolls are operated at high speeds which is very difficult to control without employing complicated and expensive means for cooling the mixing rolls and controlling the temperature of the material being mixed. Oftentimes, the intense heat generated by friction of the material with the mixing rolls is injurious to the material being mixed.

The present invention proposes apparatus for mixing rubber and material having like characteristics which is a decided improvement over the apparatus previously used, especially in that the heat generated is reduced to a minimum without the use of complicated and expensive cooling systems and that the material can be more thoroughly kneaded and mixed in considerably less time. It has been found that with the apparatus of the present invention, rubber and like materials can be more thoroughly mixed in approximately one-third the time of that required to mix the same amount of material in the apparatus of the type which was used prior to the present invention.

Figure 1:
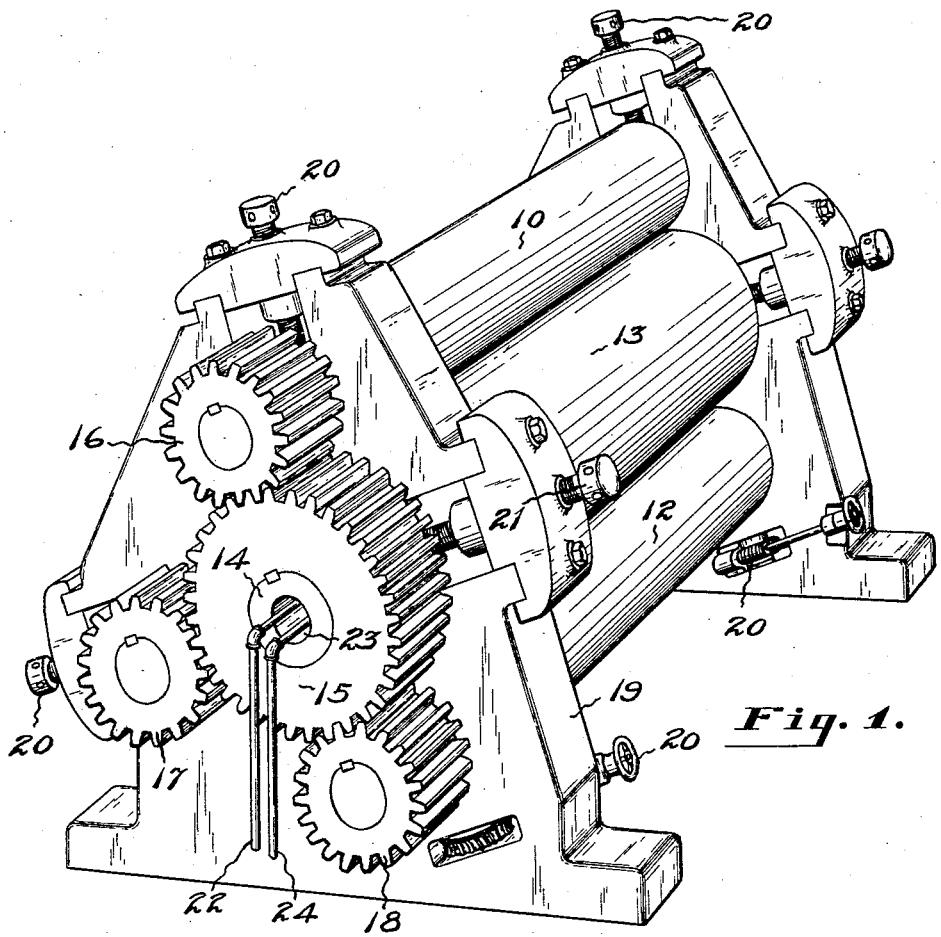
Figures 2, 3:
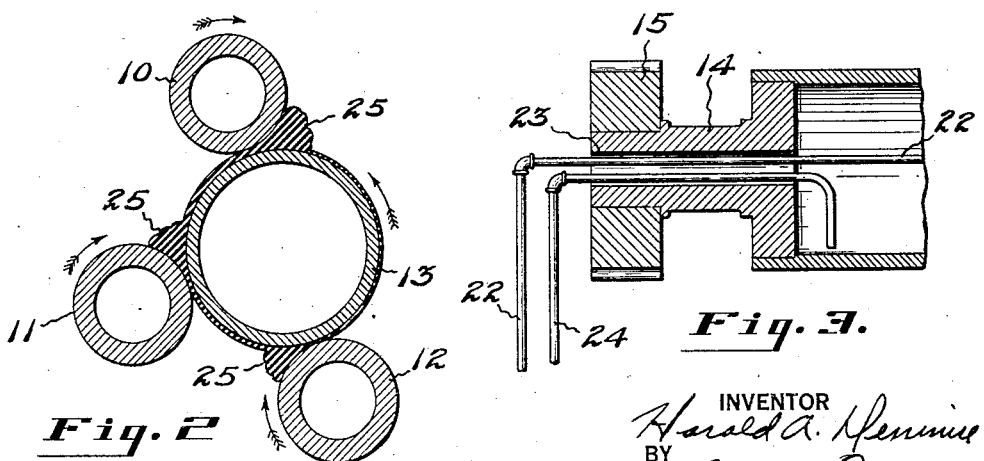
Fig. 2 is a diagrammatic view showing the general arrangement of the main mixing and several kneading rolls and showing the banks of material to be mixed.
Fig. 3 is a fragmentary longitudinal section of the main mixing roll showing the means for cooling the same.

Referring to the accompanying drawings in which like numerals refer to like parts throughout the several views, the rubber mixing mill of the present invention comprises three kneading rolls 10, 11 and 12, arranged at spaced intervals around a main mixing roll 13. The main mixing roll 13 is preferably of the conventional hollow cylindrical type and has a diameter of approximately twice that of the three kneading rolls 10, 11 and 12 as shown in Fig. 2. The main roll 13 is provided with a shaft portion 14 which closes in one end of the same and carries a gear 15 that meshes with gears 16, 17 and 18 secured to the rolls 10, 11 and 12 respectively. The roll 13 is driven at the other end by a suitable means (not shown) and is adapted to move at a surface speed of substantially half that of the kneading rolls and about a third of the speed of the previously used conventional mixing mills.

The main mixing roll and the three kneading rolls are journaled in and supported by suitable end standards 19 which carry suitable adjusting means 20 for the kneading rolls and adjusting means 21 for the main mixing roll 13 so that the spaces between the main mixing roll and the kneading rolls 10, 11 and 12 can be varied at will to meet different conditions of the material to be mixed. It has been found that the most satisfactory results can be obtained when the main roll 13 is spaced from the kneading roll 10 a distance of one-half of an inch, from the kneading roll 11 a distance of three-eighths of an inch, and from the kneading roll 12 a distance of one-quarter of an inch, or distances bearing the same proportions. These distances, however, can easily be varied by changing the adjusting means 20 and 21.

The main mixing roll 13 is continuously cooled by means of a spray pipe 22 having a plurality of perforations which centrally extends substantially the entire length of the roll and leads out through a central opening 23 formed in the gear shaft 14 substantially as shown in Fig. 3. The cooling water is forced through the perforations in the pipe 22 with sufficient pressure so that it is sprayed against the inner walls of the roll to thoroughly cool the same.

The discharged water after cooling the roll is drawn out by suction from the roll through a pipe 24 which also passes through the central opening in the gear shaft 14. The kneading rolls 10, 11 and 12 are preferably cooled in the same manner. This feature, however, is not shown in the drawings. Because of the slow speed of operation of the mixing mill of the present invention, it is evident that the simple cooling means just described will very amply compensate for the heat generated while the material is being mixed.

In operation, banks 25 of the rubber stock as shown in Fig. 2 are built up between the several kneading rolls and the main mixing roll, these banks being very thoroughly mixed with the material carried by the main mixing roll 13. The rubber stock or other material to be mixed is fed to the apparatus between the kneading roll 10 and mixing roll 13 where it, because of the differential speed of the roll 10 relative to the roll 13 which rotates with a somewhat slower surface speed, is thoroughly kneaded and conducted by the mixing roll 13 to the kneading roll 11. This kneading roll 11 being spaced from the roll 13 a lesser distance than the roll 10, and also being rotated at a greater surface speed than the main roll 13, very thoroughly and quickly kneads the material and causes the bank of stock 25 to be built up because the stock being fed to the roll is of greater thickness than the distance between the roll 11 and mixing roll 13. This thorough kneading and building up of a bank of stock again occurs at the kneading roll 12 which also rotates at a somewhat greater surface speed than the main roll 13 and is spaced from the roll 13 a lesser distance than the roll 11.

It is evident to those skilled in the art that in this way rubber and like plastic material can be more thoroughly mixed in considerable less time than by other methods previously employed, because of the relative differential action between the main roll 13 and the kneading rolls 10, 11 and 12.

It is also evident that because of the slow surface speed of the main mixing roll, a minimum amount of heat will be generated during the kneading and mixing of the rubber with the result that a very simple cooling means such as that previously described may be employed to cool the mixing and kneading rolls.

It can also be seen that with the apparatus of the present invention, rubber and like plastic materials can be very satisfactorily mixed in a comparatively short time as compared with mixing mills used heretofore.

It is to be understood that the relative surface speeds and relative diameters of the mixing and kneading rolls described have been cited as the most preferable for all practical purposes, and that other ratios of speeds and diameters of the rolls may be used if desired. This, of course, is partly dependent on the particular characteristics of the material to be mixed.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In a rubber mixing mill, a main mixing roll, a series of kneading rolls of smaller diameter than said mixing roll located in proximity to the periphery of the main roll, and means for rotating said main roll and for rotating said kneading rolls in a direction opposite that of the main roll and at greater surface speeds than said mixing roll.

2. In a rubber mixing mill, comprising a main mixing roll, and a series of kneading rolls smaller in diameter than said main roll and located in proximity to the periphery of the main roll, and means for rotating said main roll and for rotating said kneading rolls in the direction opposite that of the main roll and at greater surface speeds than said mixing roll, said kneading rolls being spaced at different distances from said main mixing roll.

3. A rubber mixing mill, comprising a main mixing roll, and a series of smaller diametered kneading rolls rotating in opposite directions to and at greater surface speeds than said main mixing roll, said kneading rolls being spaced at gradually decreasing distances from said main mixing roll in the direction of rotation of the main roll.

4. A mixing mill for plastic materials comprising a main mixing roll, a series of smaller diametered kneading rolls rotating at greater surface speeds than said main mixing roll and co-operating with said main roll to give a differential kneading action to the material being mixed, said kneading rolls being spaced at gradually decreasing distances from said main mixing roll, and means for cooling said main mixing roll.

In testimony whereof I affix my signature.

HAROLD A. DENMIRE.